(12) United States Patent
Yang

(10) Patent No.: US 11,940,209 B2
(45) Date of Patent: Mar. 26, 2024

(54) INTELLIGENT TRANSPORT SYSTEM

(71) Applicant: GPANS SMARTLO CO., Seoul (KR)

(72) Inventor: Hyoun Seok Yang, Seoul (KR)

(73) Assignee: GPANS SMARTLO CO., Seoul (KR)

( * ) Notice: Subject to any disclaimer, the term of this patent is extended or adjusted under 35 U.S.C. 154(b) by 715 days.

(21) Appl. No.: 17/054,092

(22) PCT Filed: Apr. 9, 2019

(86) PCT No.: PCT/KR2019/004191
§ 371 (c)(1),
(2) Date: Nov. 9, 2020

(87) PCT Pub. No.: WO2019/216555
PCT Pub. Date: Nov. 14, 2019

(65) Prior Publication Data
US 2021/0270520 A1 Sep. 2, 2021

(30) Foreign Application Priority Data
May 10, 2018 (KR) .......................... 10-2018-0053920

(51) Int. Cl.
*F25D 29/00* (2006.01)
*B60P 3/20* (2006.01)
(Continued)

(52) U.S. Cl.
CPC .............. *F25D 29/003* (2013.01); *B60P 3/20* (2013.01); *G01K 13/00* (2013.01);
(Continued)

(58) Field of Classification Search
CPC ...... F25D 29/003; F25D 2700/12; B60P 3/20; G01K 13/00; G01K 13/024; G01K 3/005;
(Continued)

(56) References Cited

U.S. PATENT DOCUMENTS

| 7,455,225 B1 * | 11/2008 | Hadfield | ............... G07C 5/085 |
| | | | 235/444 |
| 2013/0271290 A1 * | 10/2013 | Saenz | ................... G05D 27/02 |
| | | | 340/870.07 |

(Continued)

FOREIGN PATENT DOCUMENTS

| CN | 108830529 A | * | 11/2018 | ........... G06Q 10/083 |
| CN | 109426202 A | * | 3/2019 | |

(Continued)

OTHER PUBLICATIONS

Campos et al.; Technologies applied in the monitoring and control of the temperature in the Cold Chain; 2018 IEEE 2nd Colombian Conf. on Robotics and Automation (CCRA), Barranquilla, Colombia; 2018; pp. 1-6 (Year: 2018).*

(Continued)

*Primary Examiner* — Michael J Zanelli
(74) *Attorney, Agent, or Firm* — Osha Bergman Watanabe & Burton LLP

(57) ABSTRACT

The present invention relates to an intelligent transport system and more specifically, to an intelligent transport system for enabling, in domestic or international transport, people participating in a transport system to monitor an overall transport state such as that of temperature, humidity, and location of goods being transported. One embodiment of the present invention provides a transport monitoring system comprising a temperature monitoring unit, a humidity monitoring unit, a position monitoring unit, a state monitoring unit, an information monitoring unit, and a monitoring control unit for controlling a transport process of the goods on the basis of information obtained by the temperature monitoring unit, the humidity monitoring unit, the position monitoring unit, the state monitoring unit, and the information monitoring unit.

8 Claims, 12 Drawing Sheets

(51) Int. Cl.
  *G01K 13/00* (2021.01)
  *G06Q 10/0832* (2023.01)
  *G06Q 10/0833* (2023.01)
  *G07C 5/00* (2006.01)

(52) U.S. Cl.
  CPC ..... *G06Q 10/0832* (2013.01); *G06Q 10/0833* (2013.01); *G07C 5/008* (2013.01); *F25D 2700/12* (2013.01)

(58) Field of Classification Search
  CPC ........... G06Q 10/0832; G06Q 10/0833; G06Q 10/08; G06Q 50/28; G07C 5/008
  See application file for complete search history.

(56) References Cited

U.S. PATENT DOCUMENTS

2016/0148440 A1* 5/2016 Kwak .................... G07C 5/085
                                                   701/31.5
2017/0372262 A1* 12/2017 Haney .................... G06Q 50/28

FOREIGN PATENT DOCUMENTS

| KR | 20120113202 A | 10/2012 | |
|---|---|---|---|
| KR | 20150139225 A | 12/2015 | |
| KR | 20160094597 A | 8/2016 | |
| KR | 20170020155 A | 2/2017 | |
| KR | 20170142418 A | 12/2017 | |
| WO | WO-0229644 A1 * | 4/2002 | ............. G06Q 10/08 |

OTHER PUBLICATIONS

Dittmer et al.; The Intelligent Container as a Part of the Internet of Things; Proceedings of the 2012 IEEE International Conference on Cyber Technology in Automation, Control and Intelligent Systems May 27-31, 2012, Bangkok, Thailand; pp. 209-214 (Year: 2012).*
Zhou et al.; Intelligent Cargo Tracking System Based on the Internet of Things; 2012 15th International Conference on Network-Based Information Systems; pp. 489-493 (Year: 2012).*
International Search Report issued in International Application No. PCT/KR2019/004191 dated Aug. 12, 2019 (2 pages).
Written Opinion issued in International Application No. PCT/KR2019/004191 dated Aug. 12, 2019 (5 pages).
Office Action issued in corresponding KR Application No. 20207031192 with English translation dated Jul. 22, 2022 (12 pages).

* cited by examiner

INTELLIGENT TRANSPORT SYSTEM

TECHNICAL FIELD

The present invention relates to an intelligent transport system, and more particularly, to an intelligent transport system for enabling, in domestic or international transport, people participating in the transport system to monitor overall transport conditions, such as temperature, humidity, and location, of goods being transported.

BACKGROUND ART

In a transport process for transporting goods from a producer of the goods (cargo or logistics) to consumers, a variety of people including producers, such as farmers and fishers, or manufacturers, customers who order goods, inspection agencies which examine goods, and carriers which take charge of movement of goods, participate. Also, a transport process involves various forms of goods transport methods including air transport, land transport, and the like. Such a transport process should be designed so that goods may be rapidly transported from producers to customers in an intact state. Also, in a transport process, it is important to increase reliability, safety, and freshness of goods. When goods require low-temperature distribution, the importance of increasing reliability, safety, and freshness of the goods becomes more prominent.

Meanwhile, low-temperature distribution systems encompass cold chains. A cold chain is a method of transporting fresh groceries, such as fish, meat, fruits, and vegetables, from producing centers to houses without degrading the freshness by maintaining a low temperature. In general, a cold chain denotes a method of maintaining and transporting goods, which are required to be maintained in low temperature, in a specific low-temperature state. In an entire product distribution process from producers to consumers, cold chains supply products while maintaining temperature of the products so as not to degrade the freshness and thereby prevents a sudden rise in the price of the products. Also, cold chains allows distribution at a stable price by maintaining freshness.

As for cold chains, when products stored in a freezer container are not maintained at an appropriate temperature for freshness, various bacteria may be generated, and during distribution, huge loss may be caused by problems such as quality degradation. In addition to cold-chain distribution, when several types of loss are caused in a goods transport process, it is necessary to find which stage or location the loss has occurred at. To this end, there is a need for a system for monitoring conditions, such as temperature, humidity, and location, and a transport process of goods being distributed throughout a goods distribution process and a reference or standard thereof.

DISCLOSURE

Technical Problem

The present invention is intended to solve the above problems and is mainly directed to providing an intelligent transport system for enabling, in domestic or international transport, people participating in the transport system to monitor overall transport conditions, such as temperature, humidity, and location, of goods being transported.

Technical objects of the present invention are not limited to those mentioned above, and other technical objects which are not mentioned will be clearly understood by those of ordinary skill in the art from the following description.

Technical Solution

One aspect of the present invention provides a transport monitoring system for monitoring a transport process of goods, the transport monitoring system including a temperature monitoring unit configured to receive temperature information of a cargo storage means that is measured in advance from a temperature measurement sensor installed in the cargo storage means in which the goods are stored, a humidity monitoring unit configured to receive humidity information of the cargo storage means that is measured in advance from a humidity measurement sensor installed in the cargo storage means, a location monitoring unit configured to receive location information of the cargo storage means from a location sensor installed in the cargo storage means, a status monitoring unit configured to receive video information of cargo stored in the cargo storage means from a camera installed in the cargo storage means, an information monitoring unit configured to receive information related to the goods, and a monitoring control unit configured to control the transport process of the goods on the basis of the information acquired by the temperature monitoring unit, the humidity monitoring unit, the location monitoring unit, the status monitoring unit, and the information monitoring unit.

The information related to the goods may include at least one of origin information, producer information, sales place information, weight information, raw material information, manufacturing date information, and inspection history information.

The monitoring control unit may check whether at least one of temperature and humidity of the cargo storage means deviates from a preset reference value on the basis of the temperature information and the humidity information.

When it is determined that at least one of the temperature and the humidity of the cargo storage means deviates from the preset reference value, the monitoring control unit may control a temperature adjustment means and a humidity adjustment means installed in the cargo storage means so that the temperature and the humidity of the cargo storage means may be changed to a preset appropriate temperature and the humidity values for the goods.

When it is determined that at least one of the temperature and the humidity of the cargo storage means deviates from the preset reference value, the monitoring control unit may record a location of the cargo storage means and whether the cargo stored in the cargo storage means is opened.

The transport monitoring system may further include a terminal configured to receive and display at least one of the temperature information, the humidity information, the location information, and the video information.

The transport monitoring system may further include an interoperation server configured to interoperate with at least one of the temperature monitoring unit, the humidity monitoring unit, the location monitoring unit, the status monitoring unit, the information monitoring unit, and the monitoring control unit so that at least one of the temperature information, the humidity information, the location information, and the video information may be checked.

Another aspect of the present invention provides a transport monitoring system for monitoring a transport process of goods, the transport monitoring system including a monitoring server including a temperature monitoring unit configured to receive temperature information of a cargo storage means that is measured in advance from a temperature measurement sensor installed in the cargo storage means in which the goods are stored, a humidity monitoring unit configured to receive humidity information of the cargo storage means that is measured in advance from a humidity measurement sensor installed in the cargo storage means, a location monitoring unit configured to receive location information of the cargo storage means from a location sensor installed in the cargo storage means, a status monitoring unit configured to receive video information of cargo stored in the cargo storage means from a camera installed in the cargo storage means, an information monitoring unit configured to receive information related to the goods, and a monitoring control unit configured to control the transport process of the goods on the basis of the information acquired by the temperature monitoring unit, the humidity monitoring unit, the location monitoring unit, the status monitoring unit, and the information monitoring unit, an interoperation server configured to interoperate with the monitoring server so that at least one of the temperature information, the humidity information, the location information, and the video information may be checked, and a terminal configured to interoperate with the monitoring server and receive and display at least one of the temperature information, the humidity information, the location information, and the video information.

Advantageous Effects

According to the present invention, in domestic or international transport, people participating in a transport system are allowed to monitor overall transport conditions, such as temperature, humidity, and location, of goods being transported, and it is possible to provide a standard of transport monitoring.

According to the present invention, it is possible to periodically monitor the temperature, humidity, and location of goods being distributed throughout a goods distribution process based on a cold chain. Accordingly, it is possible to find a cause and an occurrence location of a quality degradation problem, such as the propagation of bacteria or food rot, which may occur in a cold-chain distribution process.

According to the present invention, it is possible to provide an integrated monitoring system which allows safe transport, sharing of accurate goods information, tracking of goods conditions by simultaneously monitoring a transport situation, such as the location, conditions, and arrival time of goods, and status of goods, such as the origin, inspection history, producer, temperature, humidity, and whether the goods are opened. When it is checked whether goods are opened in a transport or storage process which is a logistics task, it is possible to clarify where responsibility for a theft or forgery lies.

According to the present invention, when goods are damaged, participants in a transport system can contact each other in real time and thus can rapidly cope with the damage. Also, the connection between producers and consumers is supported so that the reliability of a distribution process can be ensured.

According to the present invention, data of goods is accumulated. Then, when loss, such as damage or rot, occurs to the goods, it is possible to find at which stage the loss has occurred, that is, a cause and an occurrence location of the loss. Also, the data can be converted into big data for usage.

Effects of the present invention are not limited to those mentioned above and should be understood as including all effects that can be inferred from a configuration of the present invention described in the detailed description or claims of the present invention.

BEST MODES OF THE INVENTION

Figure 1:
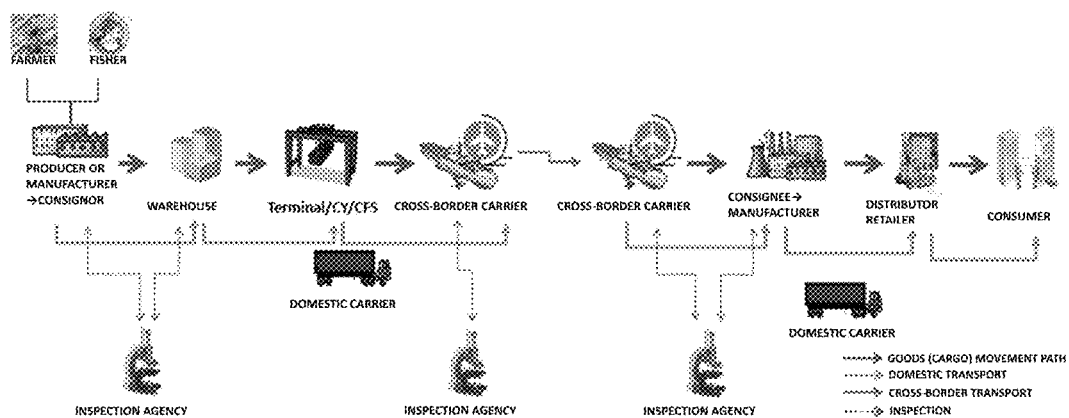
FIG. 1 is a diagram illustrating movement of domestically or internationally transported cargo to which embodiments of the present invention may be applied.

Hereinafter, the present invention will be described in detail with reference to the accompanying drawings. However, the present invention may be implemented in various different forms and is not limited to embodiments described herein. The accompanying drawings are merely intended to facilitate understanding of embodiments disclosed herein, and the technical spirit disclosed herein is not limited by the accompanying drawings. It should be understood that all modifications, equivalents, and substitutes fall within the spirit and scope of the present invention. To clearly describe the embodiments of the present invention, portions not related to the description are omitted, and the size, form, and shape of each element shown in the drawings may be variously modified. Throughout this specification, the same or similar reference numerals are assigned to the same or similar parts.

The suffixes "module" and "unit" for elements used in the following description are given or used together in consideration of convenience in drafting the specification and do not have a distinct meaning or role by themselves. Also, in the following description of embodiments disclosed herein, detailed descriptions of well-known related arts may be omitted when they make the gist of the embodiments unclear.

Throughout this specification, when a part is referred to as being "connected (joined, contacted, or coupled)" to another part, this includes a case in which the part is "directly connected (joined, contacted, or coupled)" to the other part as well as a case in which the part is "indirectly connected (joined, contacted, or coupled)" to the other part with still another member interposed therebetween. Further, when a part is referred to as "including (having or provided with)" an element, this denotes that the part does not exclude another element and can further "include (have or be provided with)" another element unless specifically stated otherwise.

The terms used herein are for the purpose of describing only specific embodiments and are not intended to limit the present invention. The singular form includes the plural form unless clearly indicated otherwise, and elements which are implemented in a distributed manner may be embodied in a combined form unless otherwise specified. In this specification, the terms "including," "having," or the like are used to specify that features, numbers, steps, operations, elements, parts, or combinations thereof described herein are present, and the term does not preclude the presence or addition of one or more other features, numbers, steps, operations, elements, parts, or combinations thereof.

Although terms including ordinal numbers, such as first and second, may be used herein to describe various elements, the elements should not be limited by the terms. The terms are only used to distinguish one element from another. For example, without departing from the scope of the present invention, a first element may be named a second element, and similarly, a second element may be named a first element.

According to embodiments of the present invention, it is possible to provide an intelligent transport system which allows freight land transportation content identification and communication and allows monitoring of cargo condition information during transport.

Embodiments of the present invention may be used to establish guidelines for transport and condition monitoring of transported consignments, such as agri-foods, through applications, models, processes, and information bundles which have been established in advance (e.g., established by the International Standardization Organization (ISO)). Embodiments of the present invention may be used to enhance the requirements for the transport and inspection of agri-foods for reliability, safety, and freshness. Embodiments of the present invention may apply to both domestic and cross-border transport of transported cargo. Embodiments of the present invention may incorporate the methods described in specific transport domains, for example, ISO TS 24533" and "ISO TS 17187." Specific extensions include additional actors in a model related particularly to the agriculture transport sub-domain with extended specific processes and additional information items and/or information bundles of cargo conditions.

FIG. 1 shows movement of domestically or internationally transported cargo to which embodiments of the present invention may be applied. FIG. 1 shows a flow of cargo moved from a producer to a customer through a supply chain.

A carrier delivers cargo from a producer (a farmer or a fisher) or a manufacturer to a customer side through a logistics base in a global supply chain. Various embodiments of the present invention may be used by customers, producers, or manufacturers.

In global distribution and supply chains, reliability, safety, and freshness of contained or non-contained goods (e.g., agri-foods) are the most important factors in transporting the goods. In order to boost values of the factors, in transporting between types of domestic transport, cross-border transport, or domestic and cross-border transport including storage, the accurate status of cargo should be checkable, and an accurate location should be checkable in real time for reliable and safe transport and freshness of cargo.

Transport information of cargo or goods may be shared among relevant participating business entities (e.g. inspection agencies). Sharing information, such as agricultural certificate of origin, agri-foods, agricultural status, and product integrity (regarding agricultural pesticides or radioactive materials) may improve visibility and reliability of goods transport (regarding contained or non-contained goods).

In contrast to packaged goods, agricultural products and marine products are transported from consignors to consignees through non-standardized package units, and freshness and safety for agricultural products are the most important factor regarding transport. In food manufacturing industries, a company has to produce a food product using a raw agricultural material, for example, corn or salmon. Consumers want to know detailed information about the raw material or product such as whether residual agricultural pesticides or radioactive materials which may remain in agricultural goods are found in agricultural products or food products or whether the residual agricultural pesticides or radioactive materials exceed allowable limits. Once a standard is established according to embodiments of the present invention, global trade in food products may be enhanced, and high-value logistics services, such as cold-chain transport, may be increased.

In order to use information across internal systems and integrate the information with systems deployed by trading partners, the information needs to be semantically coherent and in a format which is recognizable and usable by all parties. For example, a policy for operating under rules is that all business entities wishing to engage with other business partners to facilitate electronic trade using the previously described tools should follow certain standards of practice for information interchange. According to various embodiments of the present invention, an international standard is provided to be the core standard for interoperability for all enterprises wishing to benefit from the resulting efficiencies, and members and users may use the international standard accordingly.

According to various embodiments of the present invention, transport data needs within the international supply chain may be provided to satisfy the requirements of both businesses and governmental organizations. The international standard which may be provided according to embodiments of the present invention does not constrain the requirements of customs, regulations, and safety organizations at border crossings but may include data elements likely to be required by customs authorities, agriculture organizations, and other involved organizations. The international standard which may be provided according to embodiments of the present invention is focused on transport of agricultural goods as well as other products, and it is not to be confused with standards related to agricultural products.

Among terms used herein, a business area usually corresponds to a division of an enterprise and may be structured recursively. A business area is a category of decomposable business areas or process areas (on the lowest level of a business area hierarchy). A business area includes other business areas, process areas, or business process use cases.

Among terms used herein, an enterprise should be understood as a real world entity which has business significance shared among two or more business partner types in a collaborative business process (e.g., product, order, and account).

Among terms used herein, a business process is a collection of related and structured activities or tasks for achieving a particular business goal. Complex business processes may involve many participants and may be made up of other business processes. The simplest business process involving two participants may be referred to as a business transaction.

Among terms used herein, a carrier (or transporter) means a company responsible for transporting people, goods, or cargo. Carrier containers or shipper containers mean containers over which the carrier or the shipper has control either by ownership or by the acquisition thereof under lease or rental from container companies or container suppliers or from similar sources. Carriers are prohibited from purchasing, leasing, or renting containers owned by shippers. Also, an air carrier (or air transporter) is a publicly or privately owned firm or corporation which transports goods of others over land or sea or through the air for a stated rate. According to government regulations, a common carrier is required to carry all goods offered when accommodations are available and a set rate is paid.

Among terms used herein, a cold chain is a temperature-controlled supply chain. An unbroken cold chain is an uninterrupted series of storage and distribution activities which maintain a given temperature range. A cold chain is used to help extend and ensure the shelf life of products such as fresh agricultural goods, seafood, frozen food, photographic film, chemicals, and medicines.

Among terms used herein, an export consignor means a person who sends cargo overseas through a contract with transporters such as shipper and forwarders. A consignor means a person who consigns goods to himself or herself or to another party in a bill of lading or equivalent document. A consignor may be the owner of the goods or a cargo forwarder who consigns goods on behalf of his or her principal. As presented in ISO 19845:2015 (reformatted), a consignor may mean a party consigning goods as stipulated in the transport contract. A buyer, delivery, seller, or dispatcher may also play the role of a consignor and may also be referred to as a transport user. A consignor may be stipulated in a transport contract.

Among terms used herein, a cargo forwarder is a person or company which handles transport of goods for consignors. Theoretically, cargo forwarders handle transport between transporters and consignors. However, forwarders make a transport contract with transporters as agents of consignors. Also, a cargo forwarder is a person or corporation which arranges transport of goods on behalf of either the seller or buyer. In many cases, a cargo forwarder may consolidate several shipments into one larger shipment to take advantage of better cargo rates. In most cases, a cargo forwarder may assume the legal liabilities of acting as a carrier.

Among terms used herein, an import consignee means a person or company which brings overseas cargo to a country through a contract with transporters such as shippers and forwarders.

Among terms used herein, an information model is an abstract and formal representation of many kinds of real-world objects, such as business documents (e.g., orders) and transportation mechanisms (e.g., trucks, containers, and ship bays), and/or abstracts objects such as entities used in a billing system. An object has a name, properties, and relationships with other objects. An information model provides a means to describe information in a domain of interest without constraining how the description is mapped to an actual implementation in software.

Among terms used herein, an inspection agency is a company which conducts counting and status checking against cargo when the cargo is loaded to or unloaded from transport means. An inspection is generally an organized examination or formal evaluation exercise. The results are usually compared with specified requirements and standards for determining whether the item or activity is in line with these targets, often with a standard inspection procedure for ensuring consistent checking. Inspections are usually non-destructive. Generally, inspection agencies examine for insects, radioactive materials, agricultural chemicals, heavy metal content, persistent organic pollutants, harmful organism, etc. of agricultural products, smuggled agricultural goods or packaging materials which may contain invasive species, wooden pallets which may hide the larvae of wood-boring insects poised to attack native trees or nursery stock and check whether imported crops (e.g., fruits and vegetables) are pest-free, whether there is agri-terrorism, and the like. For reference, agri-terrorism is a malicious attempt to disrupt or destroy the agricultural industry and/or food supply system of a population through the malicious use of plant or animal pathogens which cause devastating disease in the agricultural sectors. An inspection agency may mean a person or company which brings overseas cargo to a country through a contract with transporters such as shippers and cargo forwarders.

Among terms used herein, a loading/unloading company means a company which conducts loading or unloading of cargo on behalf of importers, exporters, and shippers. A logistics point means a particular space designated as a basic facility for transport. Logistics may be divided into a transport route, an end point, and a branch. Logistics points are branches and include a terminal, an inland container depot (ICD), and a bonded warehouse.

Among terms used herein, a process area means a series of common tasks within a business area. A process area may be structured recursively. A process area is a category of common business process use cases. In other words, a process area includes other process areas or business process use cases.

Among terms used herein, a producer (e.g., a farmer or a fisher) means a person, company, or country which makes, grows, or supplies goods or commodities for sale. A farmer (also called an agriculturer) is a person engaged in agriculture or raising living organisms for food or raw materials. The term usually applies to people who do some combination of raising field crops, orchards, vineyards, poultry, or other livestock. Generally, a fishery is an entity engaged in raising or harvesting fish which is determined by some authority to be a fisher. According to the United Nations Food and Agriculture Organization (FAO), a fishery generally includes the people involved, the species or types of fishes, the area of water or seabed, a method of fishing, the class of boat, the purpose of activities, or a combination of the foregoing features. The definition often includes a combination of fishes and fishers in a region, the latter fishing for similar species of fishes.

Among terms used herein, a service repository or a service provider creates a web service and provides corresponding information to a service registry. Each provider debates upon many hows and whys, such as which service to expose, which to give more importance to: security or easy availability, what price to offer the service for, and much more. The provider also has to decide what category the service should be listed in for a given broker service and what sort of trading partner agreements are required to use the service.

Among terms used herein, a service broker, a service registry, or a service repository has a main function of making information on a web service available to any potential requestor. A person who implements the broker decides the scope of the broker. Public brokers are available anywhere and everywhere, but private brokers are only available to a limited amount of the public. Universal description, discovery, and integration (UDDI) is an early attempt which no longer actively supports web service discovery.

Among terms used herein, a shed temporarily stores cargo unlike a regular warehouse, in which cargo is stored for a relatively long period of time, and means a terminal, an ICD, a container yard (CY), a bonded warehouse, or the like.

Among terms used herein, a shipper means a company which has delegated authority to conduct a part or the whole of particular business of shippers. An agent means an independent person or corporation which acts as a representative usually in a foreign market and attempts to sell products for an overseas seller (principal) and earns a commission on successful sales.

Among terms used herein, BC means business collaboration, BP means a business process, BT means a business transaction, CFS means a container cargo station, CY means a container yard, EA means an enterprise architecture, HTTP means the hypertext transfer protocol, IEC means the International Electrotechnical Committee, IEEE means the Institute of Electrical and Electronics Engineers, ISO means the International Organization for Standardization, IT means information technology, SMTP means the simple mail transport protocol, TCP/IP means the transmission control protocol/Internet protocol, UML means the unified modeling language, WEB means the world wide web, and XML means the extensible markup language.

According to various embodiments of the present invention, an architecture framework which is required for monitoring cargo condition information during transport may be proposed as a standard framework. This framework aims to speed up development, adoption, and integration of cutting-edge intelligent technologies for transport. With an emphasis on monitoring cargo condition, the framework may use information technology, sensor networks, computerized control, and production management software to improve efficiency. The framework is related to design and analysis, which enable industries to implement real-time control, and data analysis at the enterprise level throughout the extended enterprise. The architecture enables and assesses composable smart transportation systems. The architecture may be developed by integrating advanced manufacturing components with IT services employing new technologies. Therefore, this architecture framework requires functionally composed models of large, evolving, and heterogeneous domains of logistics and transport networks.

To determine how an architecture framework can be used to define architectures for smart transportation systems, requirements for smart transportation systems and architectures of the smart transportation systems which define components, component functions, and component interrelationships of a smart transportation system should be specified. Then, these requirements may be examined for architectural needs for smart transportation systems. For those needs, architecture frameworks for smart transportation systems may be developed. Therefore, in this specification, requirements of an architecture framework for monitoring cargo condition information during transport are described as shown in Table 1 below.

TABLE 1

| Requirements of architecture framework | | Details of activities on design |
|---|---|---|
| Business and technological integration across entire value chain | Functional partitioning of a system into its constituent subsystem components Specification of system-component and component-component relationships Specification of component interfaces Definition of enterprise information infrastructure models | Development of common infrastructure (architecture framework) Horizontal integration through value networks End-to-end digital integration of engineering Vertical integration and networked manufacturing systems Communication between human, machines, and resources Conceptual/information models of important information entities specified in transport of supply chain |
| Flexible structure | Specification of business process between enterprises (e.g., supply chain) and at enterprise | Dynamic business and engineering process Ad-hoc networking Dynamic configuration Simple application integration |
| Knowledge-based intelligent system | Definition of mechanisms for data collection, data exchange, and data archiving Definition of mechanisms for defining context of storing, accessing, and exchanging results of analyses about makeup, capabilities, and/or operation of manufacturing enterprise | Providing of optimized decision making Through simulation or data analysis (using big data and cloud technology) Reduction in unnecessary costs through simulation |
| Performance assessment | Definition of properties of and interrelationships between enterprise resources for enabling enterprise resource management | Resource management Sustainability: energy efficiency Key performance indicator (KPI) Development |

TABLE 1-continued

| Requirements of architecture framework | Details of activities on design |
|---|---|
| Rule-based risk management | Problem detection and alerting<br>Auto detection and monitoring<br>Building risk repository: categorizing errors (problems and faults) and reasons |

In principle, an architecture framework should be independent of the hardware system, scalable in the structure, and reusable to an extent that is possible. Also, all necessary business processes and low-level functions should be defined as simple service components. The components are stored in a service repository. The components may be used as is or used for more complex services as necessary. Users and other organizations may access this repository using standard communication protocols such as TCP/IP, HTTP, WEB services, and SMTP. A series of services required for processing corresponding data and a sequence in which the services are provided are generally determined by additional external logic typically written in Java or any other object-oriented language.

Figure 2:
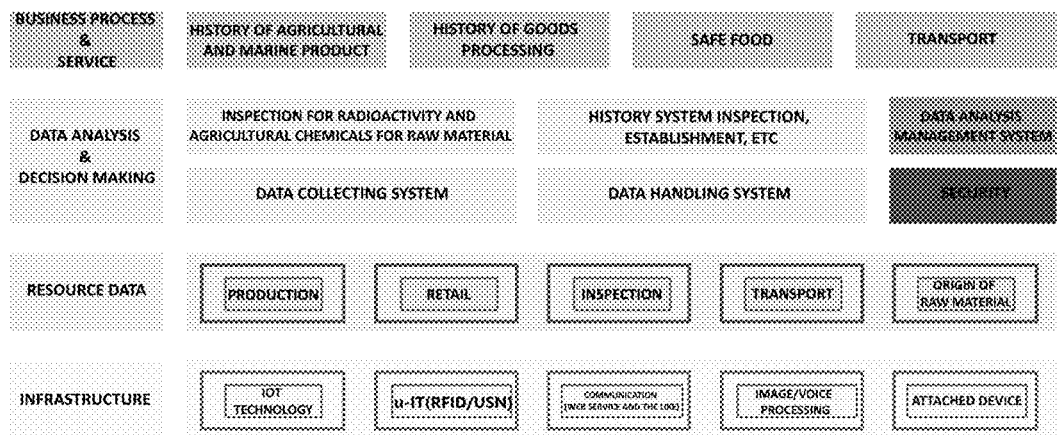
FIG. 2 is a diagram illustrating an architecture framework defined in this specification.

FIG. 2 is a diagram illustrating an architecture framework defined in this specification.

As described above, scope, reliability, safety, and freshness during transport are the most important factors in a global supply chain. Cargo condition information should be collected and managed during transport from the origin to the destination. This information includes cargo condition information, such as temperature, humidity, or whether a cargo package (or box) is opened, and inspection information.

To define an architecture framework shown in FIG. 2 and proposed according to the present invention to monitor cargo condition during transport, ISO/IEC/IEEE 42010 may be referred to. The architecture framework may be designed to be independent of the hardware system, scalable in the structure, and reusable to an extent that is possible. Also, all the necessary business processes and low-level functions should be defined as simple service components, which are stored in a service repository. Standard communication protocols, such as TCP/IP, HTTP, WEB services, and SMTP, a series of services necessary to process the corresponding data, and a sequence in which the standard communication protocols and the series of services are executed may be determined by additional external logic generally written in Java or any other object-oriented language.

Figure 3:
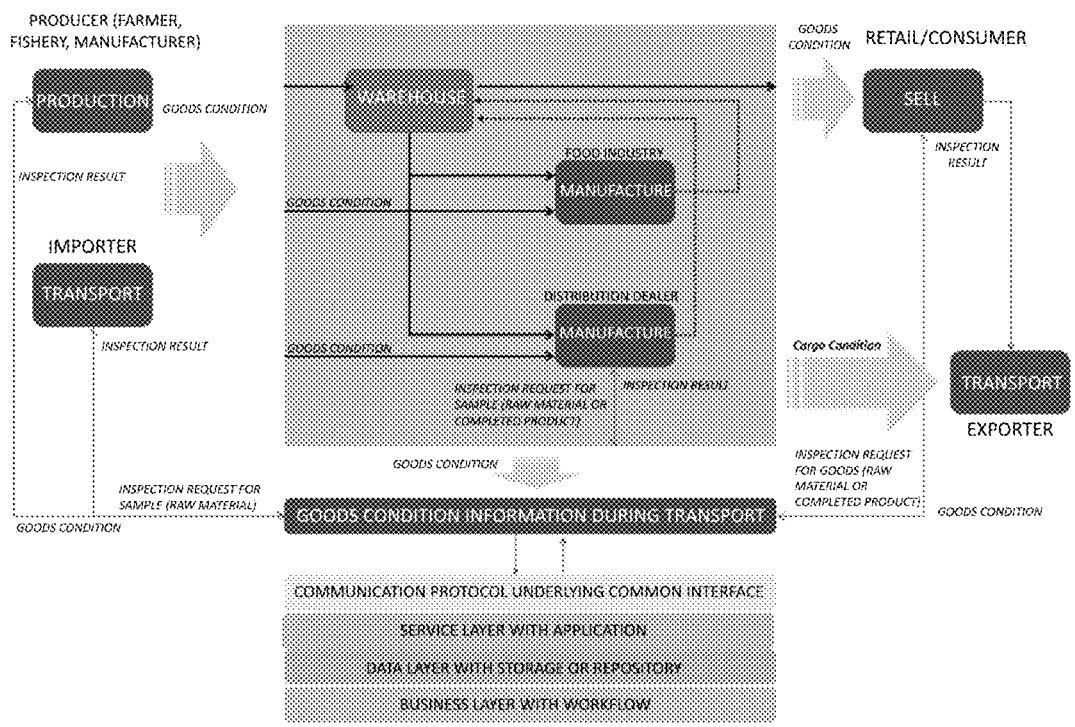
FIG. 3 is a diagram illustrating a work flow to which embodiments of the present invention may be applied and in which cargo condition information is generated depending on transport steps.

FIG. 3 is a diagram illustrating a work flow to which embodiments of the present invention may be applied and in which cargo condition information is generated depending on transport steps.

These steps start from a consignor (who requests to transport cargo or has products) and occur at any location such as an origin, a destination, a logistics base, and an inspection authority.

Cargo condition information defined in this specification includes information items such as "who generates cargo condition information," "who sends or receives cargo condition information," "an unique identifier for identifying cargo," "a history of cargo conditions during transport," "relevant entities which are involved in goods movement such as a consignor, a consignee, a forwarder, and a transport service provider," and "consignment information."

This cargo condition information should be generated or managed by a transport service provider or a transport service user.

Table 2 below shows contents and relevant business processes structured according to the ISO 19845 and United Nations Centre for Trade Facilitation and Electronic Business (UN/CEFACT) Business Requirements Specifications (BRS) analysis procedure for convenience of understanding. The business area is mainly divided into transport, loading and unloading, inspection, and status in order to minimize potential overlap of areas. Transport includes movement of cargo using means of transportation. Also, transport is divided into cross-border import/export transport, domestic transport, and transshipment and includes the processes of loading, unloading, and discharging of transported cargo at a terminal, a port, a railroad station, and the like. Storage includes entry and exit of cargo (gate in/out) in a terminal, a port, a shed, etc. for the movement cargo. Inspection includes processes occurring between users and government authorities or private inspection agencies and may vary from country to country. However, embodiments of the present invention cover common processes used in most countries.

TABLE 2

| Business area | Process area | Business process |
|---|---|---|
| Name | Name | Name |
| Agricultural goods | Domestic transport | 1. Application for domestic transport |
| | Export transport | 1. Application for export transport |
| | Import transport | 1. Application for import transport |
| | Transshipment | 1. Application for transshipment |
| Agricultural goods loading and unloading | Unloading | 1. Application for unloading |
| | Loading | 1. Application for loading |
| Agricultural goods inspection | Inspection | 1. Application for inspection |
| Status | Status report on transport | 1. Application for status report on transport |
| | Status report on inspection | 1. Application for status report on inspection |

Table 3 below shows a list of electronic messages used in each business process. Modelling is done in accordance with ISO 19845 and UN/CEFACT BRS analysis procedure.

TABLE 3

| Business process | Business collaboration | Business transaction | ISO 19845 document |
|---|---|---|---|
| Name | Name | Name | Name |
| Application for domestic transport | Process application for domestic transport | Submit application for domestic transport | Transport execution plans request |
| | | Receive application for domestic transport | Transport execution plans |
| | | Notice of result | |
| Application for export transport | Process application for export transport | Submit application for export transport | Transport execution plans request |
| | | Receive application for export transport | Transport execution plans |
| | | Notice of result | |

TABLE 3-continued

| Business process | Business collaboration | Business transaction | ISO 19845 document |
|---|---|---|---|
| Application for import transport | Process application for import transport | Submit application for import transport<br>Receive application for import transport<br>Notice of result | Transport execution plans request<br>Transport execution plans |
| Application for transshipment | Process application for transshipment | Submit order for transshipment<br>Receive order for transshipment<br>Notice of result | |
| Application for unloading | Process application for unloading | Submit order for unloading<br>Receive order for unloading<br>Notice of result | |
| Application for loading | Process application for loading | Submit order for loading<br>Receive order for loading<br>Notice of result | |
| Application for inspection | Process application for inspection | Submit application for inspection<br>Receive application for inspection<br>Notice of result | |
| Application for status report on transport | Process application for status report on transport | Submit application for status report on transport<br>Receive application for status report on transport<br>Notice of result | |
| Application for status report on inspection | Process application for status report on inspection | Submit application for status report on inspection<br>Receive application for status report on inspection<br>Notice of result | Transport status request<br>Transport status<br>Transport progress status request<br>Transport progress status |

Meanwhile, the intelligent transport system provided according to embodiments of the present invention aims to increase reliability, stability, and freshness during transport.

As for reliability, embodiments of the present invention make it possible to check whether the movement of cargo is suspended, calculate estimated arrival time for just-in-time arrival, and check whether a container is opened during transport, thereby increasing reliability.

As for safety, embodiments of the present invention increase safety by checking inspection information of raw materials or completed products, checking whether smuggled agricultural products or packaging materials which may contain invasive species are in a transport or storage step, checking a malicious attempt to disrupt or destroy the agricultural industry and/or the food supply system of a population through the malicious use of plant or animal pathogens to cause devastating disease in the agricultural sectors, checking accurate status of cargo, such as a change in the numerical value of an inspection factor, depending on surroundings, and checking traceability of cargo during production, transport, and storage.

As for freshness, embodiments of the present invention increase freshness by checking the status of cargo during transport and checking temperature, humidity, whether a package is opened, vibrations, g-force, etc. as status information.

To provide the above factors, embodiments of the present invention should collect and analyze data and may provide the analysis results to a transport service provider and user. Therefore, when the transport service provider transports cargo between logistics bases (e.g., a transport service requestor and a transport service user such as a consignor, an inspection agency, a storage service provider, a port, a terminal, a railroad station, and a consignee), an e-document (which can be changed between enterprises and includes cargo information such as status and inspection results) is generated regarding cargo movement, status, and inspection information.

Figure 4:
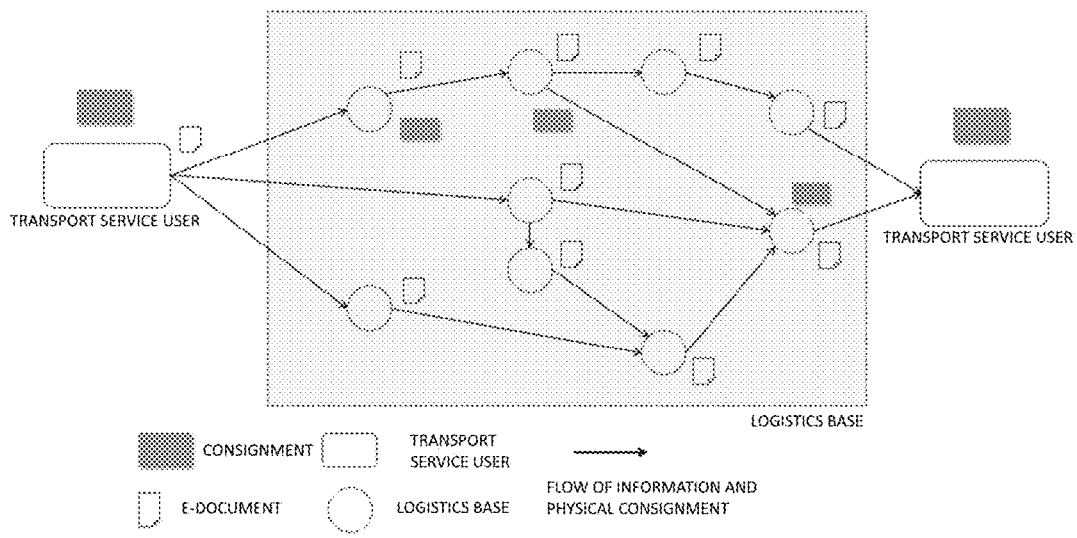
FIG. 4 is a diagram showing a common framework which may apply to embodiments of the present invention to provide reliable and safe transport and freshness of cargo.

FIG. 4 is a diagram showing a common framework which may apply to embodiments of the present invention to provide reliable and safe transport and freshness of cargo.

To develop required information according to embodiments of the present invention, business requirements and the related business processes may be analyzed using international standard modeling methodology, and information and goods movement flow may be completely understood.

FIG. 4 shows a service configuration diagram for providing reliable and safe transport and freshness of agro-fishery products. Cargo specified as a yellow rectangular box is physically transported by a transport service provider, and e-documents exchanged between business entities are cargo transport, cargo condition, and inspection information. As specified in FIG. 2, cargo physical transport flow and cargo information flow may not be the same, and generation time points may also be different. A transport service user and a logistics base correspond to a consignor, a consignee, a storage service provider, an inspection agency, a port/terminal/railroad station, and the like. A transport service provider who receives a transport request picks up cargo from the location of a transport service user and transports the cargo to a destination through several logistics points. The single transport service provider may transport the cargo to the destination or may request a subsequent transport service provider to transport the cargo. In the case of cross-border transport, the latter is referred to as multimodal transport which is performed through transshipment or several means of transportation. The transport service provider should provide status information of a means of transportation and cargo which is generated before, after, or during transport, and this information should be transmitted to an entity which provides a status information tracking service. The status information tracking service provider should be able to provide status information to the transport service user on the basis of the collected information.

Figure 5:
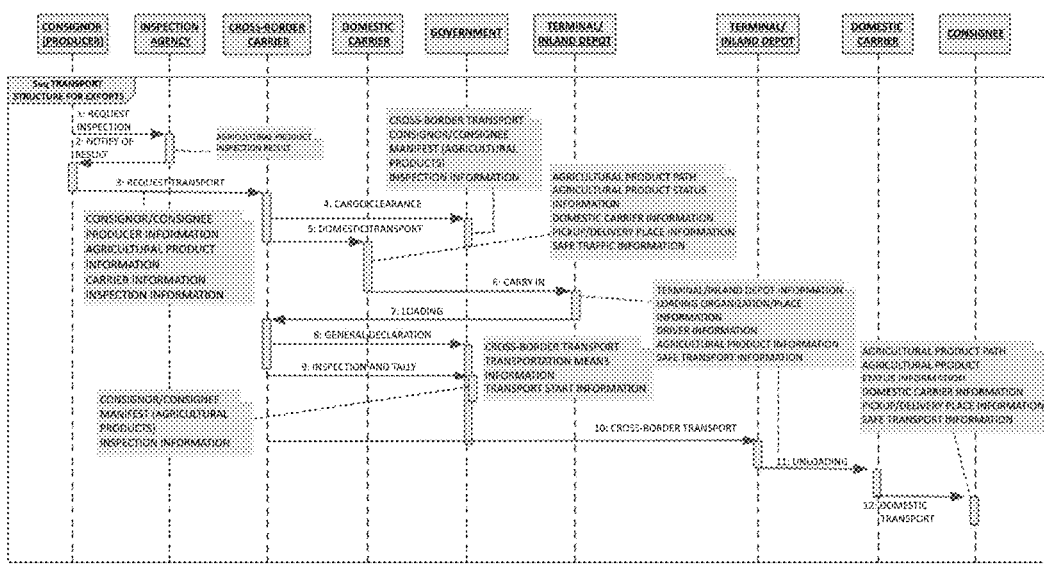
FIG. 5 is a sequence diagram of an export process which may apply to embodiments of the present invention and shows a part of flow including an example of business transactions and activities when a consignor delivers cargo to a consignee in an export business process.
Figure 6:
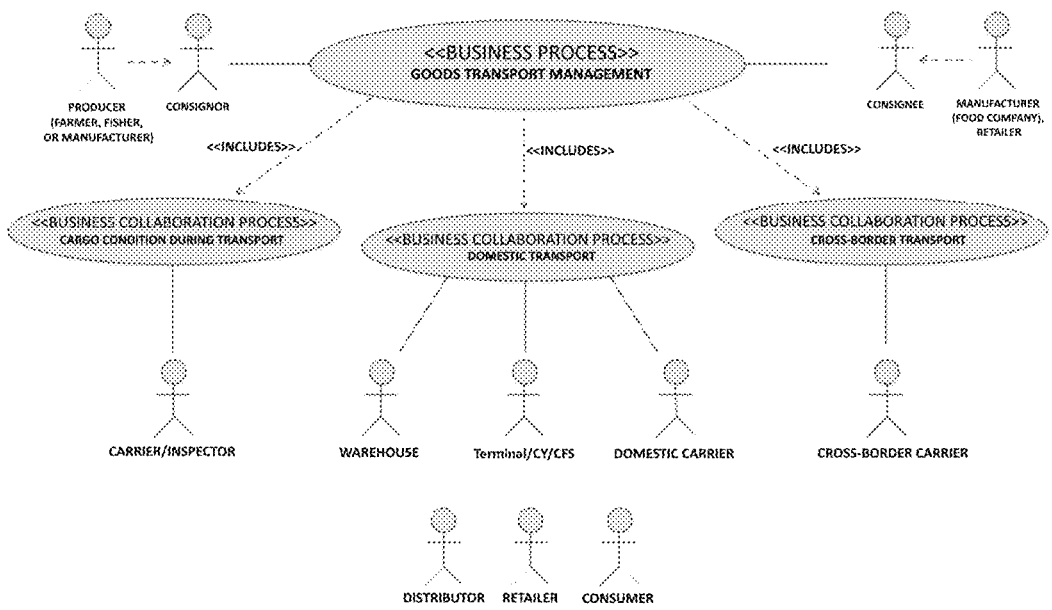
FIG. 6 is a use case diagram of a goods transport management business process which may apply to embodiments of the present invention and includes a collaboration process with the participating companies.

FIG. 5 is a sequence diagram of an export process which may apply to embodiments of the present invention and shows a part of flow including an example of business transactions and activities when a consignor delivers cargo to a consignee in an export business process. Also, FIG. 6 is a use case diagram of a goods transport management business process which may apply to embodiments of the present invention and includes a collaboration process with the participating companies. The use case diagram of high-level UML shown in FIG. 6 illustrates business actors who are involved in a goods transport management business process and dependencies on the business process.

Modeling of FIG. 5 is performed using a use case diagram, a process specification, an activity diagram, and a business transaction activity diagram. In the modeling process, data elements required for tracking status information are derived, and the derived data elements are used as input factors to the following information modeling.

The "goods transport management" business process of FIG. 5 has the participating entities such as a consignor, a consignee, a carrier, an inspector, etc., and includes business collaboration processes such as monitoring cargo condition information during transport, in particular, domestic and cross-border transport.

Table 4 below shows process descriptions such as a precondition, a definition, an exception, etc. regarding the "goods transport management" business process among transport service users, such as a consignor and a consignee, and transport service providers such as a domestic carrier and a cross-border carrier.

TABLE 4

| | |
|---|---|
| Preconditions | Producers should have cargo such as agricultural products or marine products, and trade business starts between consignor and consignee |
| Conditions for start | After trade business, goods transport business process starts when transport service requestor requests inspection service provider to inspect agricultural goods before domestic or cross-border transport |
| Definitions | Transport service user requests transport service provider to transport cargo from one place to another Transport in this business process hereby includes domestic and cross-border transport Transport service user indicates producer, consignor, consignee, warehouse, terminal, CFS/CY, inspection agency, manufacturer, etc. Transport service provider indicates domestic carrier and cross-border carrier |
| Conditions for end | Transport service provider delivers cargo to designated transport service user |
| Exceptions | Transport service provider may reject transport request from transport service user |
| Postconditions | |

Figure 7:
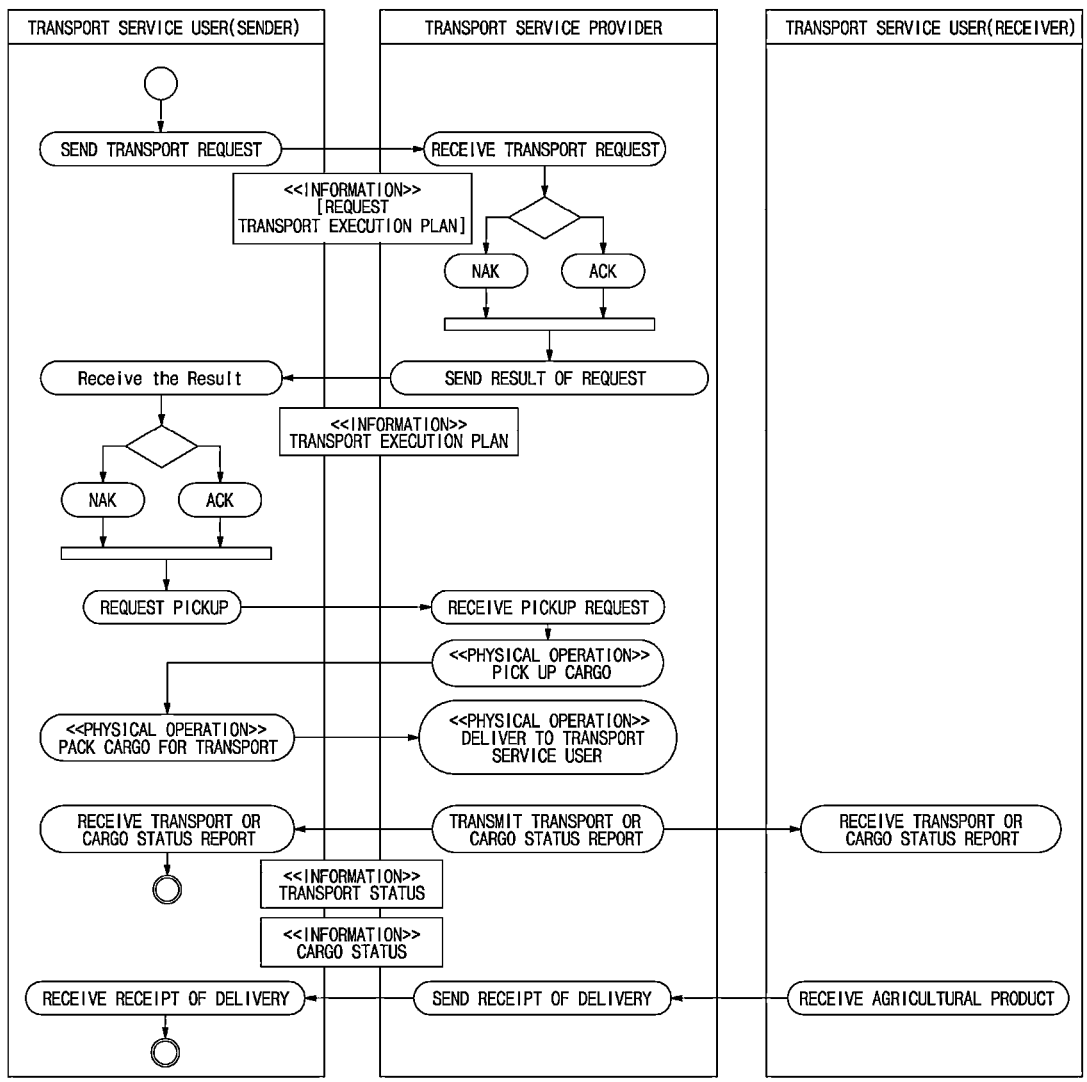
FIG. 7 is an activity diagram of the "goods transport management" business process to which embodiments of the present invention may be applied.

FIG. 7 is an activity diagram of the "goods transport management" business process to which embodiments of the present invention may be applied.

This diagram shows the sequence of activities between a transport service user and a transport service provider. The transport service user includes a consignor, a consignee, a cargo forwarder, etc., and the transport service provider includes a cross-border carrier or a domestic carrier. This business process starts when the transport service user sends a "transport request" to the transport service provider. Then, the transport service provider picks up cargo from an origin and delivers the cargo to a designated destination. While the cargo is transported or stored in a certain place, the transport service provider sends status information of the cargo or transport to the transport service user.

The transport service user wants to inspect goods to ensure freshness or safety before and/or after transport. In this case, the transport service user becomes an inspection service user (e.g., a producer, such as a farmer or a fisher, a consignor, a consignee, a manufacturer (e.g., a food company), a retailer, a distributor, a governmental organization, and the like) or a requestor. Also, the transport service user requests transport service provider to deliver the goods. The transport service provider picks up the goods from the transport service user and delivers the goods to an inspection service provider (e.g., a government inspection agency or a private inspection agency).

Figure 8:
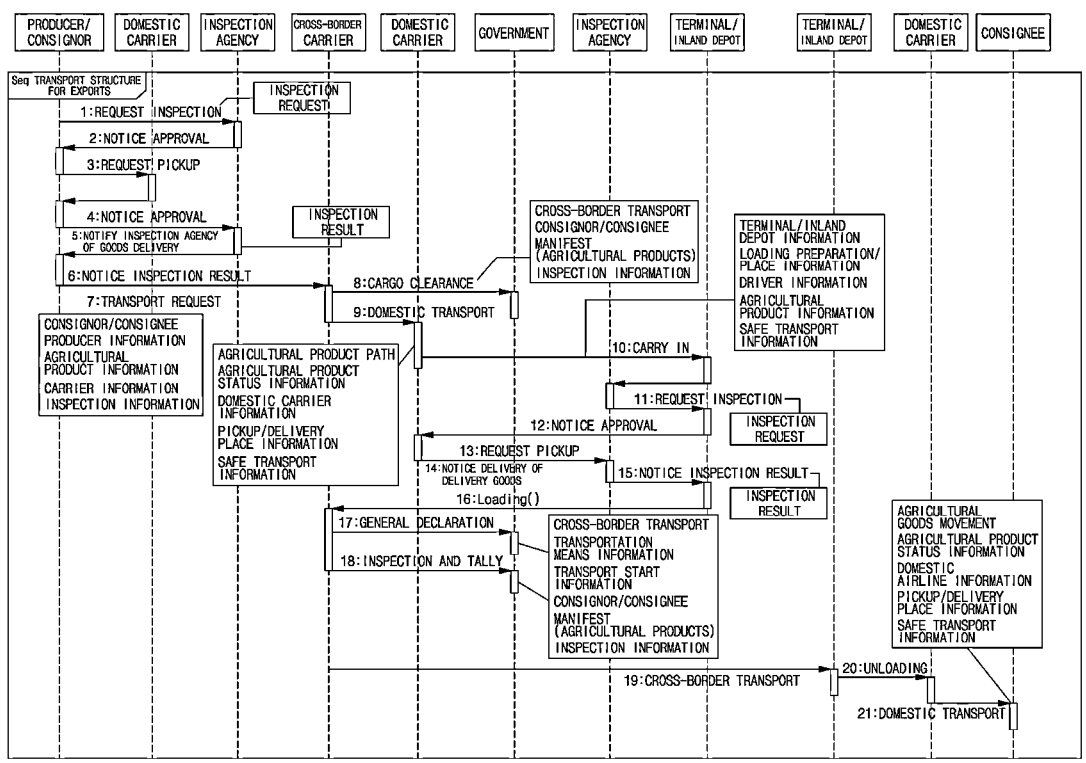
FIG. 8 is a sequence diagram of a case in which a consignee exports goods and an inspection business process is included according to embodiments of the present invention.
Figure 9:
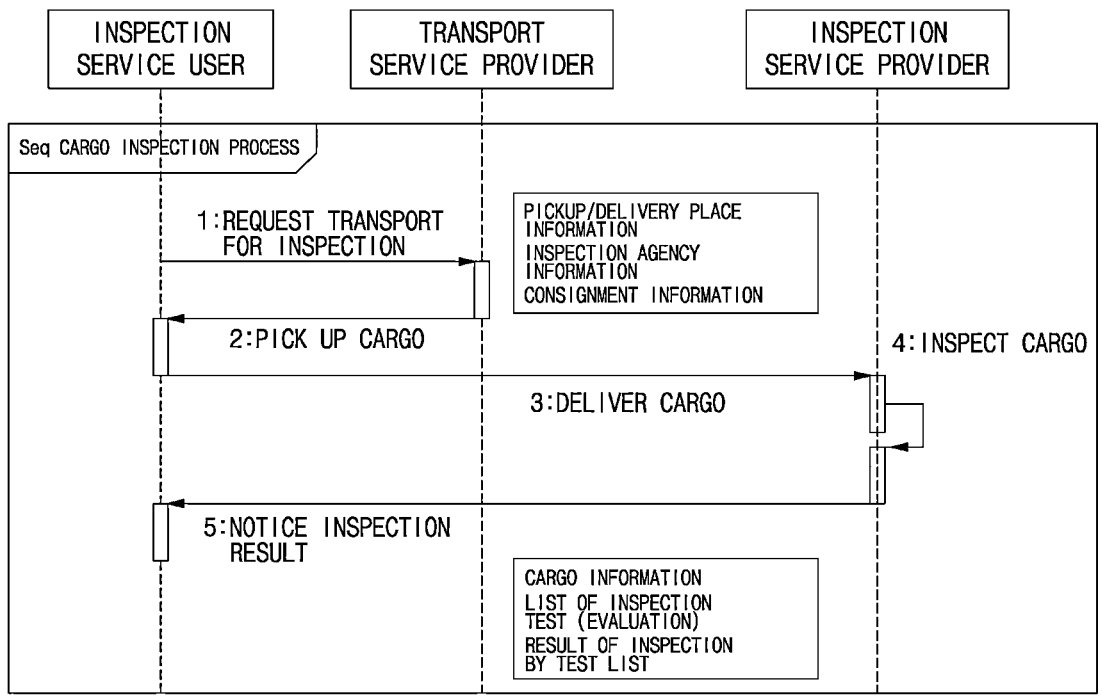
FIG. 9 is a sequence diagram of a cargo inspection service during transport according to embodiments of the present invention.
Figure 10:
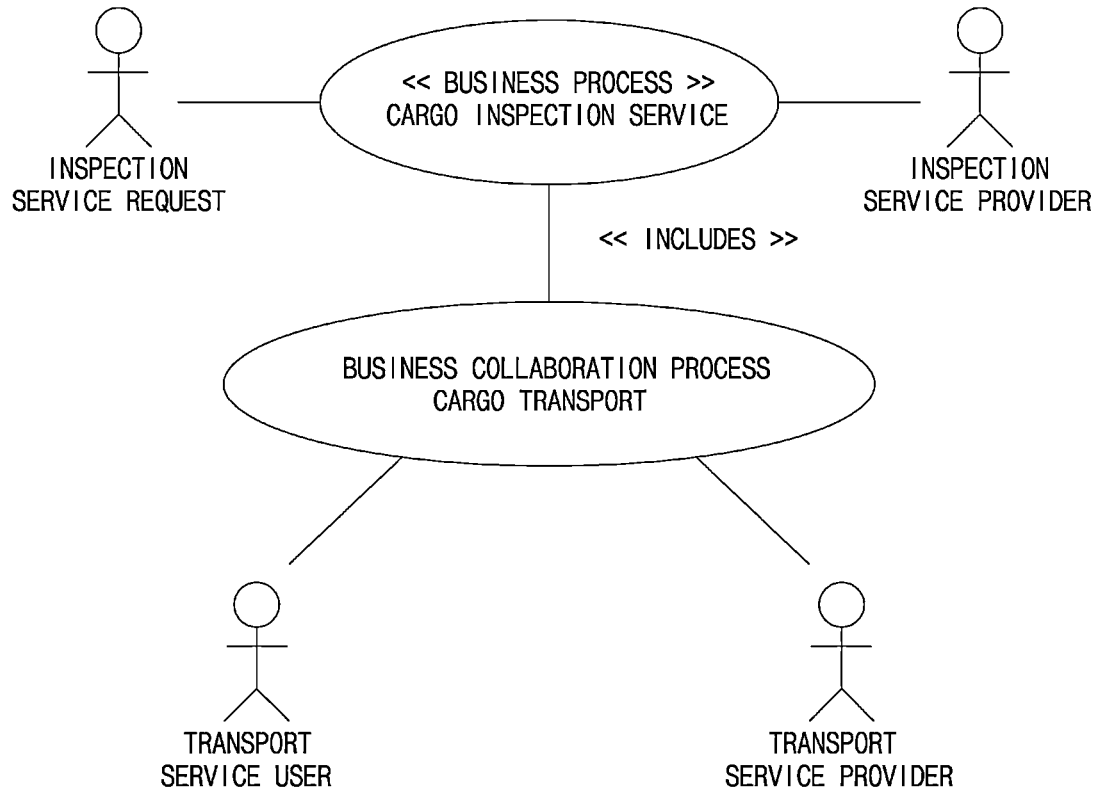
FIG. 10 is a use case diagram of a cargo inspection service according to embodiments of the present invention.

FIG. 8 is a sequence diagram of a case in which a consignee exports goods and an inspection business process is included according to embodiments of the present invention. FIG. 9 is a sequence diagram of a cargo inspection service during transport according to embodiments of the present invention. FIG. 10 is a use case diagram of a cargo inspection service according to embodiments of the present invention.

Referring to FIG. 8, in a whole export business process performed among a consignor, an inspection agency, a carrier, a government, and a consignee according to the present invention, procedures including inspection request, approval notice, pickup request, approval notice, goods delivery inspection notice, inspection result notice, transport request, cargo clearance, domestic transport, inland (terminal) carry-in, inspection request, approval notice, pickup request, goods delivery notice, inspection result notice, unloading, entrance and clearance notice, inspection, cross-border transport, unloading, domestic transport-related information notice, etc. may be performed among them. These procedures may also be performed through terminals of participants in the business process.

The present invention may provide a transport method of performing, between terminals, related information transmission and reception processes, for example, i) a consignor terminal requests an inspection agency terminal to check the temperature and humidity of goods to be distributed through a cold chain, whether the goods are opened, whether the goods are damaged, etc., ii) when an inspection result request is received from an inspection agency terminal, the consignor terminal transmits a pickup request to a transport agency terminal, iii) the transport agency terminal requests cargo clearance to a government organization terminal, iv) when cargo clearance approval notice is received from the government organization terminal, the transport agency terminal notifies a specific terminal of cross-border transport and domestic importation of the goods to be distributed through a cold chain, and v) a consignee terminal notifies the transport agency terminal of unloading information.

Table 5 below shows process description, such as preconditions, definitions, and exceptions regarding the inspection service business process between an inspection service requestor and an inspection service provider.

TABLE 5

| | |
|---|---|
| Preconditions | Inspection service user |
| Conditions for start | Inspection service user sends request for inspection service of agricultural goods to inspection service provider |
| Definitions | Inspection service user checks the following factors for agricultural goods before business operations such as import, export, manufacturing, distribution, etc. Search for insects, radioactive materials, agricultural chemicals, heavy metal content, persistent organic pollutants, harmful organisms, etc. of agricultural goods which are transported and stored Check whether there are smuggled agricultural products or packaging materials which may contain invasive species Check whether there are wooden pallets which may hide larvae of wood-boring insects poised to attack native trees or nursery stock Check whether imported agricultural goods (e.g., fruits and vegetables) are pest-free Check whether there is agri-terrorism. For reference, agri-terrorism is a malicious attempt to disrupt or destroy agricultural industry and/or food supply system of population through malicious use of plant or animal pathogens which cause devastating disease in agricultural sectors. |

TABLE 5-continued

| | |
|---|---|
| Conditions for end Exceptions | Inspection service provider sends results of inspection service to inspection service user |
| Postconditions | If results of public inspection service have a problem, government agency gives restrictions to inspection service user. For example, when agricultural goods are held somewhere, a government agency may reject some requests (export, import, and distribution) or imposes fine on inspection service user. |

Figure 11:
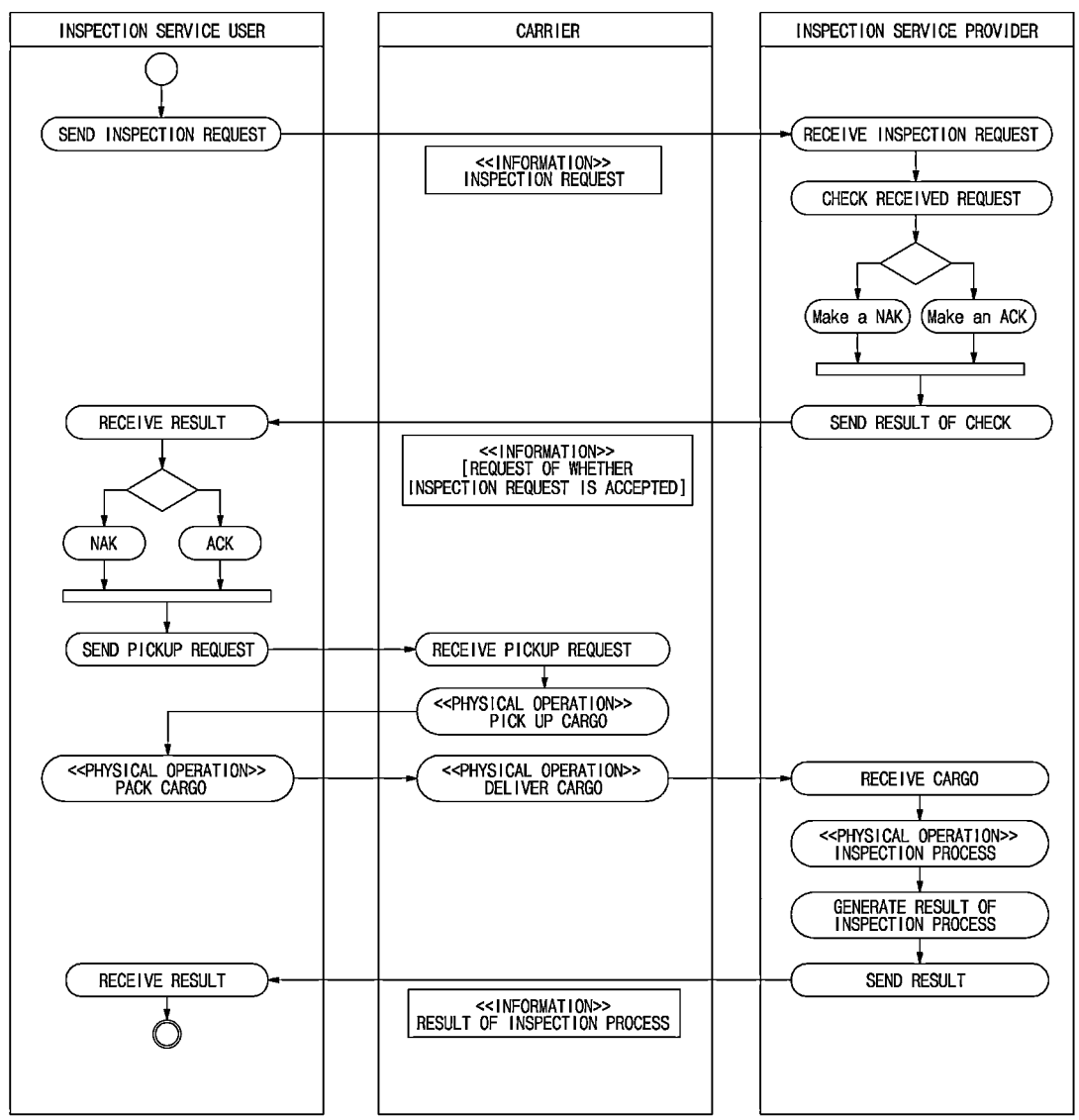
FIG. 11 is an activity diagram of an inspection service business process according to embodiments of the present invention.

FIG. 11 is an activity diagram of an inspection service business process according to embodiments of the present invention. This diagram shows the sequence of activities between an inspection service user and an inspection service provider. The inspection service provider includes a government agency, such as a customs office or an inspection agency, or a private inspection agency. This business process starts when the inspection service user sends an "inspection request" to an inspection service provider. Subsequently, the inspection service user sends a "pickup request" to a transport service provider (carrier). Then, the carrier picks up cargo from the location of the inspection service user and delivers the cargo to the inspection service provider. After completing an inspection process, the inspection service provider sends results of the inspection process to the inspection service user.

According to embodiments of the present invention, relevant business entities, such as a producer, a consignor, a consignee, a carrier, and an inspection agency, may provide cargo condition data during transport to a monitoring system which collects cargo condition information. When anyone wants to see cargo condition information, this collected data is provided to the relevant organization.

Figure 12:
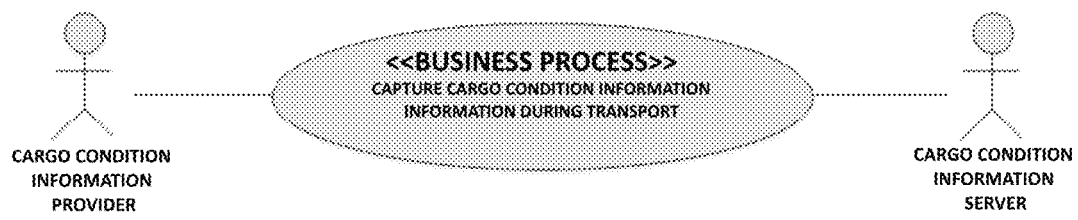
FIG. 12 is a use case diagram of capturing cargo condition information in a transport business process according to embodiments of the present invention.

FIG. 12 is a use case diagram of capturing cargo condition information in a transport business process according to embodiments of the present invention.

Table 6 below shows details, such as preconditions, definitions, and exceptions, of a cargo condition information capturing business process during transport between a cargo condition information provider and a cargo condition information server.

Figure 13:
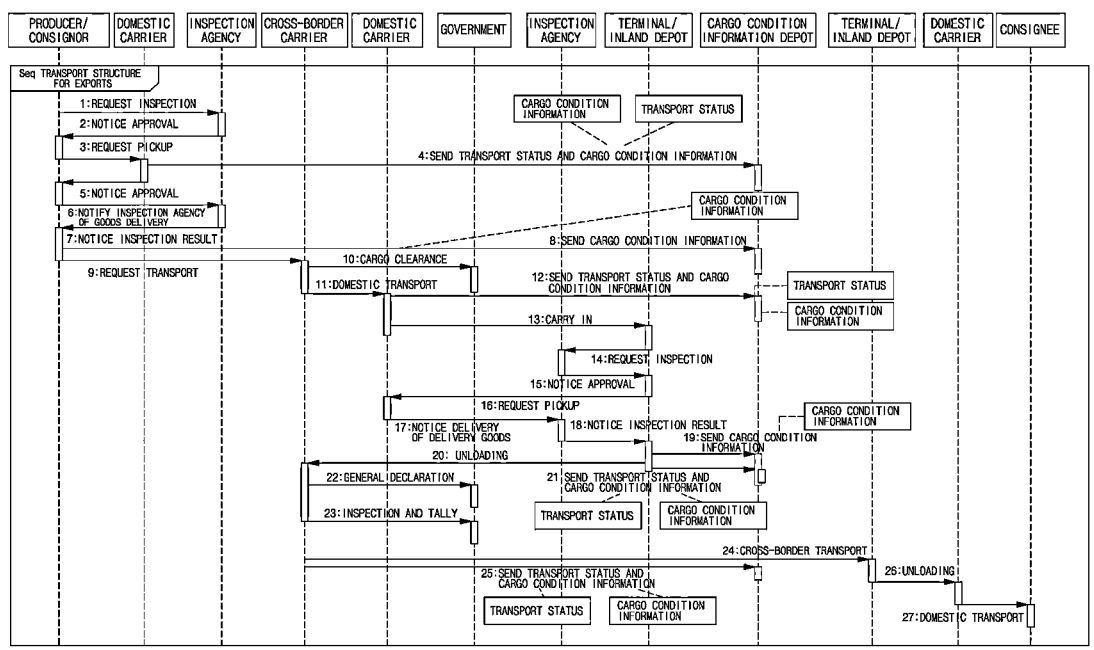
FIG. 13 is a sequence diagram of capturing cargo condition information during transport according to embodiments of the present invention.
Figure 14:
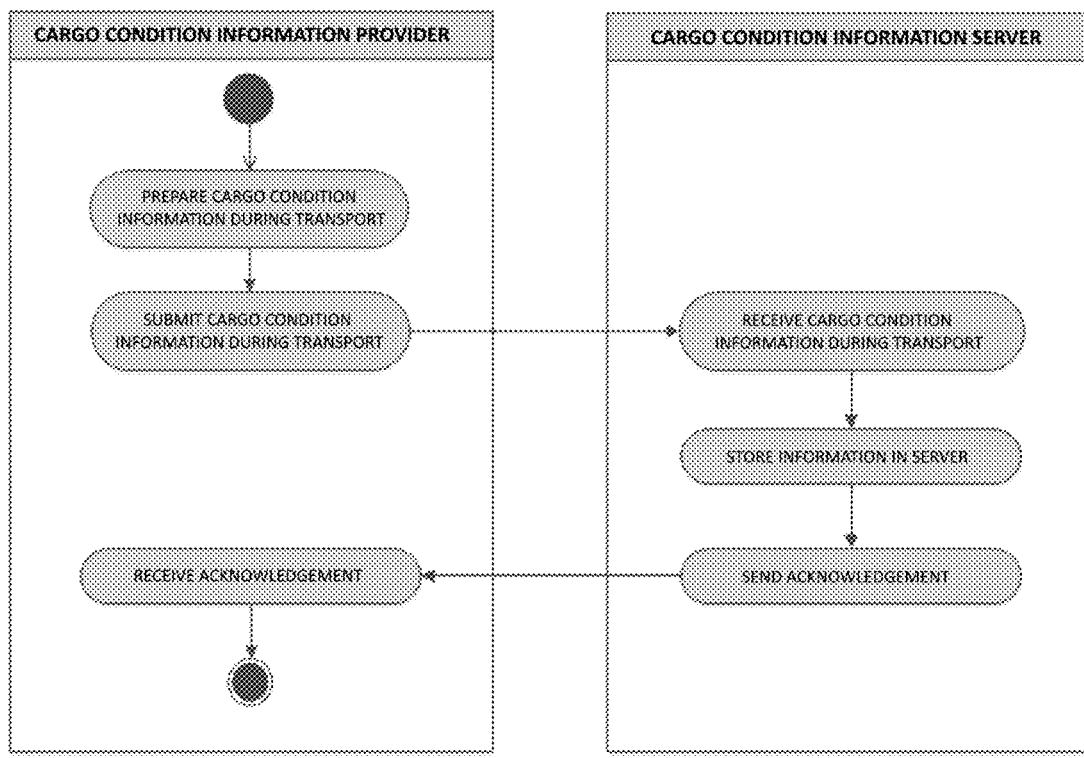
FIG. 14 is an activity diagram of the "capturing cargo condition information during transport" business process according to embodiments of the present invention.

FIG. 13 is a sequence diagram of capturing cargo condition information during transport according to embodiments of the present invention, that is, a sequence diagram about when cargo condition information is sent if someone generates the cargo condition information and a consignee exports goods through an inspection business process. FIG. 14 is an activity diagram of the "capturing cargo condition information during transport" business process according to embodiments of the present invention. This diagram shows the sequence of activities between a cargo condition information provider and a cargo condition information server, and the cargo condition information provider includes a consignee, a carrier, an inspection agency, and the like.

TABLE 6

| | |
|---|---|
| Preconditions | Relevant business entities have processed business process of handing over cargo transport work from consignor (or exporter) to consignee (or importer). To this end, relevant business entities exchange electronic data (or electronic messages) between entities or government agencies. |
| Conditions for start | This process starts before or after electronic data (or electronic messages) is exchanged or starts by performing business process for cargo movement. |

TABLE 6-continued

| | |
|---|---|
| Definitions | Exchanged electronic data (or electronic messages) is captured and sent to integrated data center as basic data for cargo condition information during transport, and data from sender is checked. |
| Conditions for end Exceptions | Relevant business entities receive acknowledgement of captured data from integrated data center. |
| Postconditions | Captured data is ready for data processing or error reported to sender. |

A business transaction defines a simple exchange of business information between two given roles and an optional response. A business transaction activity diagram shows actions that the two "given roles" carry out in a particular transaction. In this case, a business transaction activity diagram shows various responses (contained in various information envelopes) that a requesting role (buyer) and a responding role (seller) can make and resultant entity states.

Figure 15:
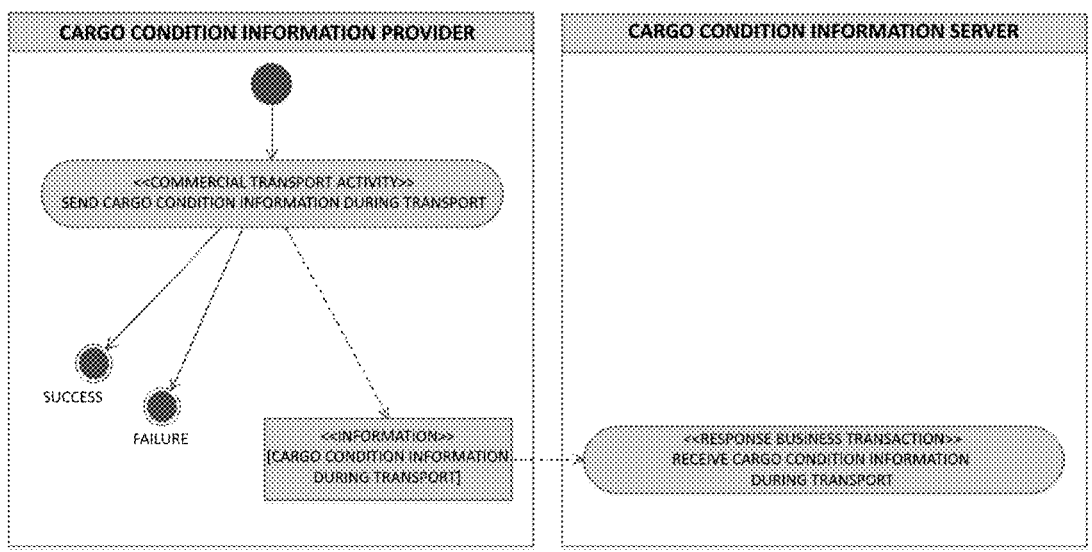
FIG. 15 is an activity diagram of capturing cargo condition information during transport according to embodiments of the present invention.

FIG. 15 is an activity diagram of capturing cargo condition information during transport according to embodiments of the present invention.

A cargo condition information provider (hereinafter, a "carrier") sends the "send cargo condition information during transport" transaction activity. A server which receives the transaction activity processes the information and sends a response to the information provider.

Meanwhile, a conceptual model identifies, in business terms, the main entity classes and their attributes for regarding each of the business entities that are referred to in information exchanges between the relevant business entities in a transport domain. A canonical data model is a formalization of the (conceptual) information model employing the core components of ISO/IEC international standard (IS) 19845 common library.

Figure 16:
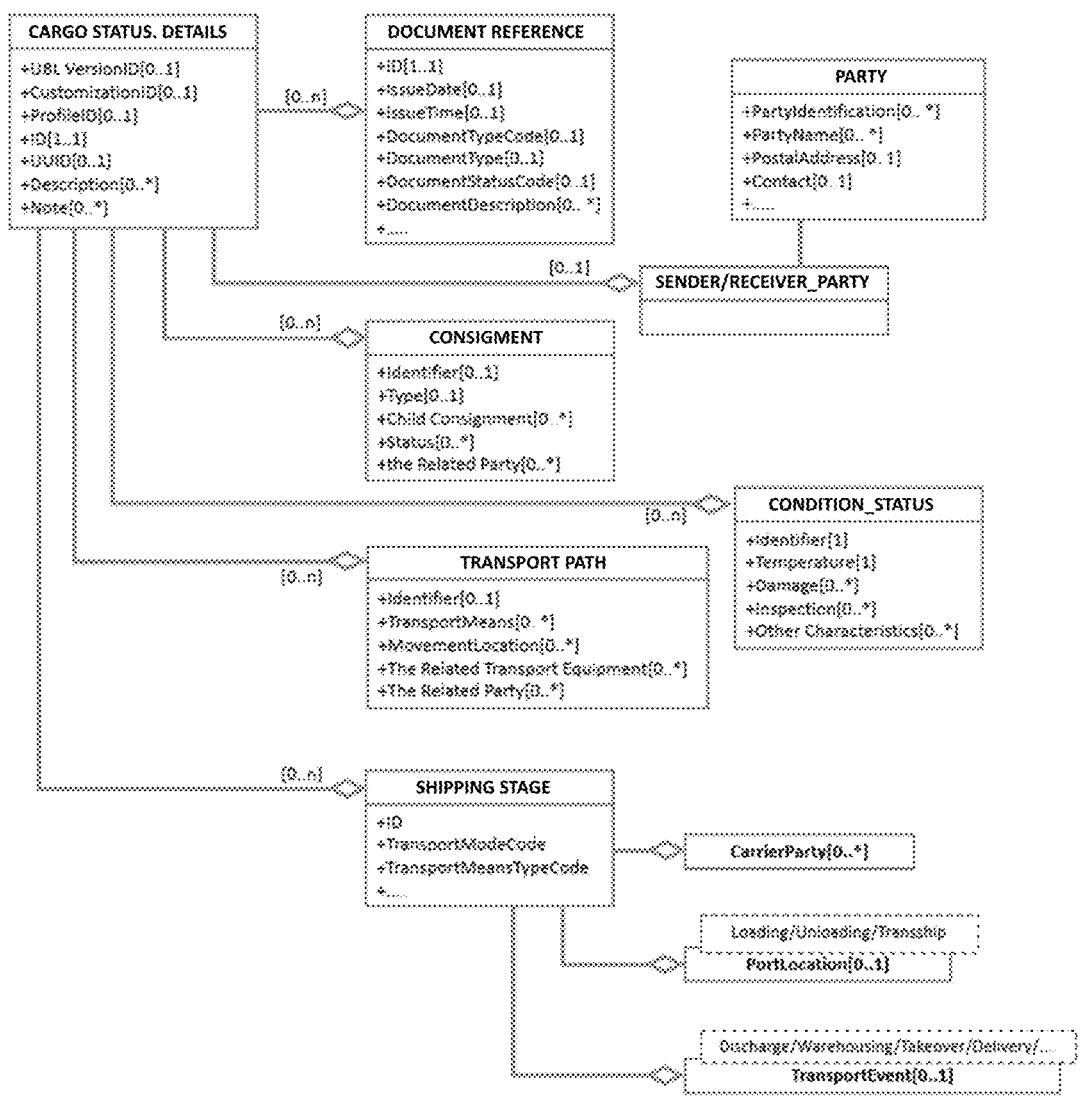
FIG. 16 is a diagram of a conceptual model for monitoring cargo condition information throughout cargo movement according to embodiments of the present invention.

FIG. 16 is a diagram of a conceptual model for monitoring cargo condition information throughout cargo movement according to embodiments of the present invention. An entity referred to as transport movement is not a part of ISO/IEC IS 19845 but is proposed to be added to the standard through an organization for the advancement of structured information standards (OASIS) universal business language (UBL) development process.

A canonical data model is a formalization of the (conceptual) information model. Information mapping is a stepwise process which starts with a conceptual information model and formulates concrete information entities which will become a template for implementing actual documents that achieve information exchanges satisfying the requirements of business processes. In this case, emphasis should be on first considering existing transport documents within ISO-IEC 19845 which may be modified by adding information items to satisfy stated requirements. When there is not a "fit," a new cargo condition document should be formulated. Basic business information entities (BBIEs) and aggregate business information entities (ABIEs) from the ISO 19845 component library should be used when available. When BBIEs and ABIEs are not available in 19845, new information entities should be postulated. These additional BBIEs and ABIEs may be included in updated 19845 as candidates.

This process also holds true for the particular "actors" and roles played by the actors in a cargo monitoring scheme. It is necessary to identify first actors and roles thereof which are already available in ISO/Ecuador (EC) IS 19845. When still necessary, new entities (such as an inspection service provider and an inspection service user as roles) should be formulated. The root element of this conceptual model is "cargo condition details," and the root element includes BBIEs and ABIEs as sub-elements. To extract data elements shown in FIG. 16, in an information mapping process according to embodiments of the present invention, various processes may be analyzed, duplicate elements may be removed, and then data elements having similar meanings may be grouped.

The class diagram of FIG. 16 is a class diagram of a conceptual model for monitoring cargo condition information and is a result obtained by grouping and schematizing data elements derived through the above-described business process modeling. A canonical data model is a compliant formalization of a (conceptual) information model. Information mapping is a stepwise process which starts with a conceptual information model and formulates concrete information entities which will become a template for implementing actual documents that achieve information exchanges satisfying the requirements of business processes. This process also applies to the particular "actors" and roles played in a cargo monitoring scheme. The root element of this conceptual model is "cargo status," and the root element includes BBIEs and ABIEs as sub-elements. To extract data elements shown in FIG. 4, in an information mapping process, a business process is analyzed, and then duplicate elements and data elements having similar meanings are removed. For information mapping, the root element of XML assembly is set to "Cargo Status, Details" first, and the root element includes ABIEs and BBIEs as sub-elements. These sub-elements are defined as aggregate core components (ACCs) according to ISO/IEC IS 19845 common library. Condition_Status. Details ABIE among ABIEs describes management data related to cargo condition information during transport and is obtained by capturing a status process area. Transport Movement. Details describes a transport itinerary or the status of transport before or after transport or during a transport procedure.

From here, it is described how information mapping develops an information model for monitoring cargo condition information during transport. First, the root element of an XML assembly is set to "Cargo Condition Status. Details." This XML assembly contains BBIEs and ABIESs which are sub-elements. These sub-elements are defined as ACCs according to ISO/IEC IS 19845 common library. Condition_Status. Details ABIE among ABIEs describes management data related to cargo condition information during transport, and the related management data is obtained by capturing a status process area. Transport Movement. Details ABIE describes a transport itinerary and the status of transport before or after transport or during a transport procedure. Since ABIEs are not explicitly available in ISO 19845 common library, a new ACC should be developed and submitted to ISO to include ABIEs in an updated ISO 19845 common library.

Figure 17:
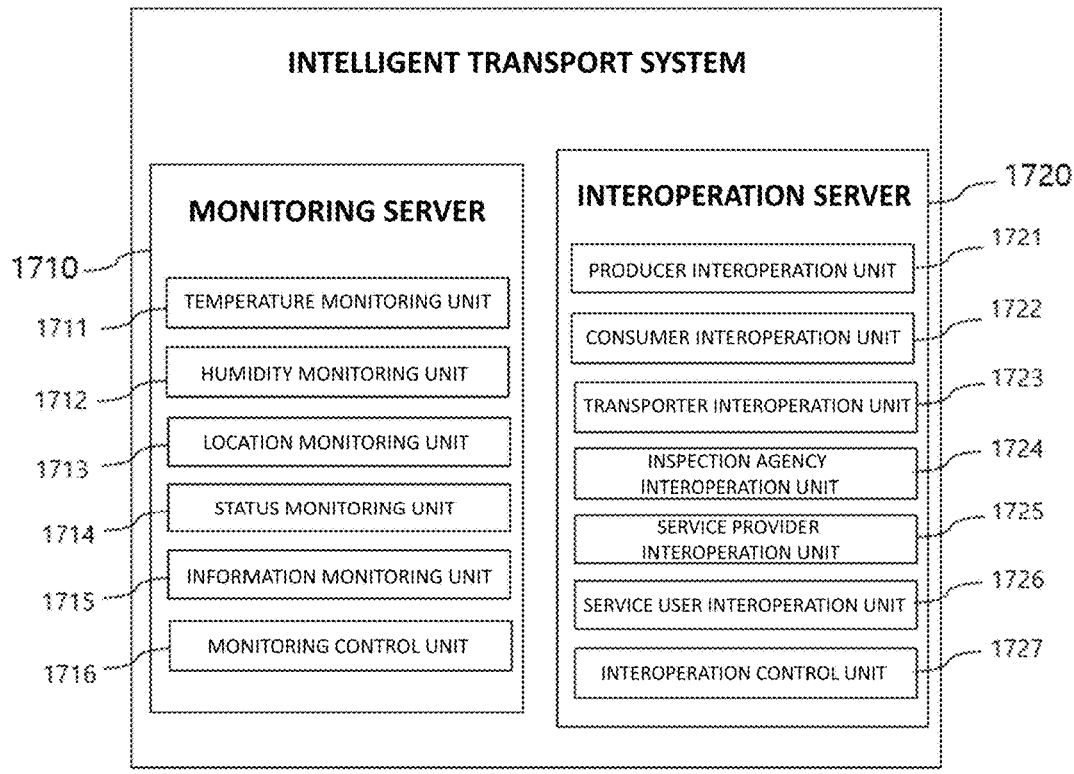
FIG. 17 is a block diagram schematically showing a configuration of an intelligent transport system provided according to embodiments of the present invention.
Figure 18:
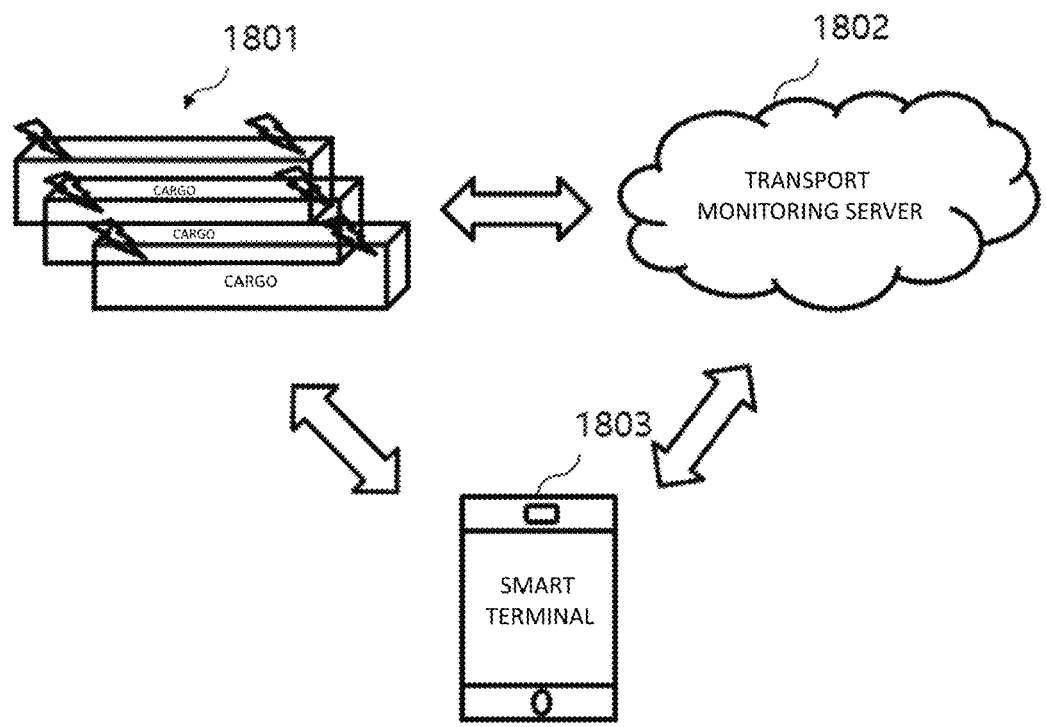
FIG. 18 is a diagram showing a sensor, a server, and a terminal included in an intelligent transport system provided according to embodiments of the present invention.

FIG. 17 is a block diagram schematically showing a configuration of an intelligent transport system provided according to embodiments of the present invention, and FIG. 18 is a diagram showing a sensor, a server, and a terminal included in the intelligent transport system provided according to embodiments of the present invention.

Referring to FIG. 17, an intelligent transport system according to an embodiment of the present invention (hereinafter, the "intelligent transport system") includes a monitoring server 1710 and an interoperation server 1720. However, every embodiment of the present invention is not necessarily implemented in the above form, and the intelligent transport system may be implemented to include only the monitoring server 1710 or the interoperation server 1720 according to embodiments of the present invention.

The monitoring server 1710 may include, but is not limited to, a temperature monitoring unit 1711, a humidity monitoring unit 1712, a location monitoring unit 1713, a status monitoring unit 1714, an information monitoring unit 1715, and a monitoring control unit 1716. The monitoring server 1710 may further include various elements which have a function of monitoring goods (logistics or cargo) being transported.

Referring to FIG. 18, an intelligent transport system according to an embodiment of the present invention may be implemented to include not only the aforementioned elements but also a transport monitoring server 1802 which serves as a control center with regard to transport of cargo 1801 and a terminal 1803 which interoperates with a server other than the aforementioned elements or sensors provided in cargo storage means. The terminal 1803 may be a smart terminal, such as a smart phone, or a personal computer (PC), such as a laptop or a desktop, but is not necessarily limited thereto. The transport monitoring server 1802 shown in FIG. 18 may be configured to include the same elements as the intelligent transport system shown in FIG. 17 and perform the same function.

The cargo storage means described herein may be containers but is not necessarily limited thereto. The cargo storage means should be construed as including anything in which goods are stored to be transportable. Cargo contained in the cargo storage means may be freight to which a cold-chain distribution process is applied, such as fish and fruits and vegetables, but is not necessarily limited thereto.

The temperature monitoring unit 1711 receives temperature information of the cargo storage means measured in advance by a temperature measurement sensor installed in the cargo storage means.

The humidity monitoring unit 1712 receives humidity information of the cargo storage means measured in advance by a humidity measurement sensor installed in the cargo storage means.

The location monitoring unit 1713 receives location information of the cargo storage means from a location sensor installed in the cargo storage means.

The status monitoring unit 1714 receives video information of cargo stored in the cargo storage means from a camera installed in the cargo storage means.

The information monitoring unit 1715 receives information of goods which are transported while being monitored by the intelligent transport system. The information of goods may include, for example, origin information, producer information, sales place information, weight information, raw material information, manufacturing date information, and inspection history information, and the like.

The monitoring control unit 1716 may control temperature, humidity, information, etc. of the transported goods on the basis of the information acquired by the temperature monitoring unit 1711, the humidity monitoring unit 1712, the location monitoring unit 1713, the status monitoring unit 1714, and the information monitoring unit 1715.

For example, the monitoring control unit 1716 may check whether at least one of the temperature and humidity of the cargo storage means deviates from a preset reference value on the basis of the temperature and humidity information. The monitoring control unit 1716 may check and record the location of the cargo storage means using location information acquired by the location monitoring unit 1713 when at least one of the temperature and humidity deviates from the preset reference value and may check and record whether the cargo stored in the cargo storage means is opened using status information acquired by the status monitoring unit 1714 when at least one of the temperature and humidity deviates from the preset reference value.

Also, the monitoring control unit 1716 may control the temperature and/or humidity of the cargo storage means using the temperature adjustment sensor and/or the humidity adjustment sensor installed in the cargo storage means to maintain an appropriate storage temperature for goods on the basis of temperature information and/or humidity information of the goods that is acquired in advance. When there is an error in information of the goods that is acquired in advance, the monitoring control unit 1716 may show a sign that it is necessary to correct the information or data of the goods.

The smart terminal 1803 shown in FIG. 18 may be communicatively connected to (or interoperate with) the monitoring server 1710 and receive at least one of the temperature information, the humidity information, the location information, the status information, and the video information.

The interoperation server 1720 may include a producer interoperation unit 1721, a consumer interoperation unit 1722, a transporter interoperation unit 1723, an inspection agency interoperation unit 1724, a service provider interoperation unit 1725, a service user interoperation unit 1726, and an interoperation control unit 1727. Unlike this, the interoperation server 1720 or elements of the interoperation server 1720 may be configured in the form of the smart terminal 1803 shown in FIG. 18.

In other words, each of the interoperation units may be configured in the form of a terminal owned by a participant of a transport process which is monitored through the intelligent transport system. Also, each of the interoperation units may interoperate with the monitoring server 1710 to check the temperature, humidity, location, status, information, etc. of goods being currently transported and to check changed histories through the monitoring control unit 1716.

The interoperation control unit 1727 may perform a function of preventing any one of participants in a transport process monitored through the intelligent transport system or each of the interoperation units from changing information or information histories of goods included in the intelligent transport system. Also, the interoperation control unit 1727 may receive data by separately requesting the interoperation units to write information related to goods transport or separately store and manage data accessible by each of the interoperation units.

In addition to the above-described elements, the intelligent transport system according to embodiments of the present invention may be configured to include a temperature sensor and a humidity sensor which measure temperature and humidity of transported goods, a temperature and humidity adjustment means which controls the temperature sensor and the humidity sensor, a camera module which acquires appearance data of the transported goods, a location sensor which acquires global positioning system (GPS) information of the transported goods, and the like. However, the intelligent transport system is not limited thereto and may further include sensors which may sense a status of the goods and a means of controlling the sensors.

For example, as an implementation example of the present invention, a transport monitoring system for monitoring a transport process of goods includes a monitoring server, an interoperation server, and a terminal. The monitoring server includes a temperature monitoring unit which receives temperature information of a cargo storage means that is measured in advance from a temperature measurement sensor installed in the cargo storage means in which the goods are stored, a humidity monitoring unit which receives humidity information of the cargo storage means that is measured in advance from a humidity measurement sensor installed in the cargo storage means, a location monitoring unit which receives location information of the cargo storage means from a location sensor installed in the cargo storage means, a status monitoring unit which receives video information of cargo stored in the cargo storage means from a camera installed in the cargo storage means, an information monitoring unit which receives information related to the goods, and a monitoring control unit which controls the transport process of the goods on the basis of the information acquired by the temperature monitoring unit, the humidity monitoring unit, the location monitoring unit, the status monitoring unit, and the information monitoring unit. The interoperation server is configured to interoperate with the monitoring server so that at least one of the temperature information, the humidity information, the location information, and the video information may be checked. The terminal interoperates with the monitoring server to receive and display at least one of the temperature information, the humidity information, the location information, and the video information.

The intelligent transport system according to embodiments of the present invention may include a communication means, which transmits information related to transported goods to an external server and is provided in a cargo storage means, to receive and communicate information on numerous transported goods in real time. As the communication means, an Internet of Things (IoT) technology and the like may be used.

When location-specific temperature and humidity information is managed according to the present invention, transported goods are passed through several entities along a storage and movement path. In this case, when spoiled cargo is delivered to a final owner of goods, it is possible to clarify where the responsibility lies using location information.

For example, when goods are delivered to a final owner thereof, it is possible to manage information about whether a consignor has kept the goods at normal temperature for a long time, whether a temperature regulation has been violated for a long time while the goods have been externally exposed due to a delayed task of unloading from a warehouse to a vehicle, whether the goods have been inappropriately stored in an intermediate warehouse, whether a driver has transported the goods with a freezer turned off to reduce fuel expenses, and whether cargo packages have been opened at each location.

Also, it is possible to clarify where responsibility for a theft or forgery lies by checking the time and location at which the package of goods has been opened. For example, in the case of a bulk package, it is difficult to check loss in the distribution process to some extent at a final destination. However, according to the present invention, when it is checked whether the bulk package has been opened in the transport and storage process, it is possible to clarify where responsibility for a theft or forgery lies.

The intelligent transport system according to embodiments of the present invention may provide an integrated monitoring system which allows safe transport, sharing of accurate goods information, tracking of a goods condition by simultaneously monitoring a transport situation, such as the location, conditions, and arrival time of goods, and status of goods, such as the origin, inspection history, producer, temperature, and humidity of the goods and whether the goods are opened.

The present invention brings about effects of safe transport, an increase in reliability between a producer and a consumer, etc. by making it possible to monitor when and where goods are distributed and from whom and to whom goods are delivered throughout a whole goods distribution process based on a cold chain. Specifically, it is possible to prevent damage, rot, etc. by periodically monitoring the temperature, humidity, and location of goods so that loss can be minimized. When loss occurs, the present invention makes it possible to find a cause and an occurrence location of the loss.

As described above, the intelligent transport system according to embodiments of the present invention may be configured to include a server which receives, manages, and stores data of goods and a user terminal which interoperates with the server. The management server and the terminal can contact each other in real time. Accordingly, when loss occurs, the management server and the terminal make it possible to rapidly cope with the loss. Also, the connection between producers and consumers is supported so that the reliability of a distribution process can be ensured.

In addition, the intelligent transport system according to embodiments of the present invention accumulates data of goods. When loss, such as damage or rot, occurs to the goods thereafter, the intelligent transport system makes it possible to find which stage the loss has occurred at, that is, a cause and an occurrence location of the loss. Also, the intelligent transport system makes it possible to convert the data into big data for usage.

The above description of the present invention is exemplary, and those of ordinary skill in the art should appreciate that the present invention can be easily carried out in other detailed forms without changing the technical spirit or essential characteristics of the present invention. Therefore, it should be noted that the embodiments described above are exemplary in all aspects and are not restrictive. The scope of the present invention is defined by the following claims, and it should be noted that the meanings and ranges of the claims and all modifications derived from the concept of the equivalents thereof fall within the scope of the present invention.

MODES FOR CARRYING OUT INVENTION

Modes for carrying out the present invention have been described above in Best Modes of the Invention.

INDUSTRIAL APPLICABILITY

Since the present invention can be applied to an intelligent transport system and repeatedly implemented, it is industrially applicable.

The invention claimed is:

1. A transport monitoring system for monitoring a transport process of goods, the transport monitoring system comprising:
a temperature monitoring unit configured to receive temperature information of a cargo storage means that is measured in advance from a temperature measurement sensor installed in the cargo storage means in which the goods are stored;
a humidity monitoring unit configured to receive humidity information of the cargo storage means that is measured in advance from a humidity measurement sensor installed in the cargo storage means;
a location monitoring unit configured to receive location information of the cargo storage means from a location sensor installed in the cargo storage means;
a status monitoring unit configured to receive video information of cargo stored in the cargo storage means from a camera installed in the cargo storage means;
an information monitoring unit configured to receive information related to the goods;
a monitoring control unit configured to control the transport process of the goods on the basis of the information acquired by the temperature monitoring unit, the humidity monitoring unit, the location monitoring unit, the status monitoring unit, and the information monitoring unit; and
wherein the transport monitoring system is configured to monitor safety by checking inspection information of raw materials or completed products, checking whether smuggled agricultural products or packaging materials which may contain invasive species are in transport or storage step,
wherein the transport monitoring system monitors freshness by checking the status of the cargo during transport and checking whether a package is opened, vibrations and g-force, as status information.

2. The transport monitoring system of claim 1, wherein the information related to the goods includes at least one of origin information, producer information, sales place information, weight information, raw material information, manufacturing date information, and inspection history information.

3. The transport monitoring system of claim 1, wherein the monitoring control unit checks whether at least one of temperature and humidity of the cargo storage means deviates from a preset reference value on the basis of the temperature information and the humidity information.

4. The transport monitoring system of claim 3, wherein when it is determined that at least one of the temperature and the humidity of the cargo storage means deviates from the preset reference value, the monitoring control unit performs control using a temperature adjustment means and a humidity adjustment means installed in the cargo storage means so that the temperature and the humidity of the cargo storage means are changed to a preset appropriate temperature and the humidity values for the goods.

5. The transport monitoring system of claim 3, wherein when it is determined that at least one of the temperature and the humidity of the cargo storage means deviates from the preset reference value, the monitoring control unit records a location of the cargo storage means and whether the cargo stored in the cargo storage means is opened.

6. The transport monitoring system of any one of claims 1 to 5,
further comprising a terminal configured to receive and display at least one of the temperature information, the humidity information, the location information, and the video information.

7. The transport monitoring system of any one of claims 1 to 5,
further comprising an interoperation server configured to interoperate with at least one of the temperature monitoring unit, the humidity monitoring unit, the location monitoring unit, the status monitoring unit, the information monitoring unit, and the monitoring control unit so that at least one of the temperature information, the humidity information, the location information, and the video information is checked.

8. A transport monitoring system for monitoring a transport process of goods, the transport monitoring system comprising:
a monitoring server comprising:
a temperature monitoring unit configured to receive temperature information of a cargo storage means that is measured in advance from a temperature measurement sensor installed in the cargo storage means in which the goods are stored,
a humidity monitoring unit configured to receive humidity information of the cargo storage means that is measured in advance from a humidity measurement sensor installed in the cargo storage means,
a location monitoring unit configured to receive location information of the cargo storage means from a location sensor installed in the cargo storage means,
a status monitoring unit configured to receive video information of cargo stored in the cargo storage means from a camera installed in the cargo storage means,
an information monitoring unit configured to receive information related to the goods, and
a monitoring control unit configured to control the transport process of the goods on the basis of the information acquired by the temperature monitoring unit, the humidity monitoring unit, the location monitoring unit, the status monitoring unit, and the information monitoring unit;
an interoperation server configured to interoperate with the monitoring server so that at least one of the temperature information, the humidity information, the location information, and the video information is checked; and
a terminal configured to interoperate with the monitoring server and receive and display at least one of the temperature information, the humidity information, the location information, and the video information;
wherein the transport monitoring system monitors safety by checking inspection information of raw materials or completed products, checking whether smuggled agricultural products or packaging materials which may contain invasive species are in transport or storage step; and
wherein the transport monitoring system monitors freshness by checking the status of the cargo during transport and checking whether a package is opened, vibrations and g-force, as status information.

* * * * *